US012602041B2

(12) United States Patent
Duan et al.

(10) Patent No.: US 12,602,041 B2
(45) Date of Patent: Apr. 14, 2026

(54) METHOD OF CONTROLLING MOVABLE PLATFORM, MOTION SENSING REMOTE CONTROLLER AND STORAGE MEDIUM

(71) Applicant: SZ DJI TECHNOLOGY CO., LTD., Guangdong (CN)

(72) Inventors: Wuyang Duan, Guangdong (CN); Ye Li, Guangdong (CN); Zhimeng Shang, Guangdong (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 176 days.

(21) Appl. No.: 18/205,578

(22) Filed: Jun. 5, 2023

(65) Prior Publication Data

US 2023/0305556 A1 Sep. 28, 2023

Related U.S. Application Data

(63) Continuation of application No. PCT/CN2021/080078, filed on Mar. 10, 2021.

(51) Int. Cl.
G05D 1/00 (2024.01)
B64U 10/13 (2023.01)

(52) U.S. Cl.
CPC .......... G05D 1/0016 (2013.01); B64U 10/13 (2023.01); G05D 1/0033 (2013.01); G05D 1/102 (2013.01)

(58) Field of Classification Search
None
See application file for complete search history.

(56) References Cited

U.S. PATENT DOCUMENTS

| | | | | |
|---|---|---|---|---|
| 10,152,052 B1* | 12/2018 | Lu | ........................... | G06F 3/017 |
| 10,209,707 B2* | 2/2019 | Matuszeski | ........... | G05D 1/617 |
| 2011/0301783 A1 | 12/2011 | Goossen | | |
| 2018/0196435 A1* | 7/2018 | Kunzi | .................. | G08G 5/0013 |
| 2019/0004509 A1 | 1/2019 | Zheng et al. | | |
| 2019/0187692 A1* | 6/2019 | Kim | ........................ | G06F 3/00 |
| 2020/0387239 A1* | 12/2020 | Parazynski | ............. | G05G 1/01 |
| 2021/0338031 A1* | 11/2021 | Kwak | .................. | B25J 11/0085 |

FOREIGN PATENT DOCUMENTS

| | | |
|---|---|---|
| CN | 105469579 A | 4/2016 |
| CN | 106292679 A | 1/2017 |
| CN | 206348922 U | 7/2017 |
| CN | 108181922 A | 6/2018 |

(Continued)

OTHER PUBLICATIONS

Machine translation of Sugaki et al. (WO-2017065106-A1) (Year: 2017).*

(Continued)

*Primary Examiner* — Navid Z. Mehdizadeh
*Assistant Examiner* — Sarah A. Mueller
(74) *Attorney, Agent, or Firm* — ANOVA LAW GROUP, PLLC

(57) ABSTRACT

A method of controlling a movable platform, which applies to a motion sensing remote controller, may include acquiring a motion scenario and/or an operating mode of a movable platform; determining control strategy of the motion sensing remote controller based on the motion scenario and/or the operating mode; and control the movable platform based on the control strategy.

23 Claims, 9 Drawing Sheets

100

200

(56)                    References Cited

FOREIGN PATENT DOCUMENTS

| | | | |
|---|---|---|---|
| CN | 108227729 | A | 6/2018 |
| CN | 209511546 | U | 10/2019 |
| CN | 110709797 | A | 1/2020 |
| WO | 2016/131127 | A1 | 8/2016 |
| WO | WO-2017065106 | A1 * | 4/2017 |
| WO | 2018045654 | A1 | 3/2018 |
| WO | 2018053845 | A1 | 3/2018 |
| WO | 2018095158 | A1 | 5/2018 |
| WO | 2018184232 | A1 | 10/2018 |

OTHER PUBLICATIONS

Rau, James V., et al., "Integrated System Design for Vertical Takeoff-Landing of Small Unmanned Aerial Vehicles", Jun. 7, 2018, IEEE, pp. 255-259 (Year: 2018).*
International Search Report and Written Opinion mailed on Jun. 9, 2021, received for PCT Application PCT/CN2021/080078, filed on Mar. 10, 2021, 8 pages including English Translation.

* cited by examiner

100

10

20

21 22 23    24   25   26

METHOD OF CONTROLLING MOVABLE PLATFORM, MOTION SENSING REMOTE CONTROLLER AND STORAGE MEDIUM

CROSS-REFERENCE TO RELATED APPLICATIONS

The present application is a continuation of International Application No. PCT/CN20211080078, filed Mar. 10, 2021, which claims priority to Chinese Patent Application No. 202011569062.6, filed Dec. 25, 2020, the entire contents of each of which being incorporated herein by reference in its entirety.

TECHNICAL FIELD

The present disclosure relates to A field of motion sensing control technology, and in particular to a control method for a movable platform, a motion sensing remote controller and a storage medium.

BACKGROUND

Movable platforms, such as UAVs, can be applied to aerial photography, inspection, forest protection, disaster survey and pesticide spraying, which in turn make movable platforms widely used. The control of an existing movable platform is mainly operated by a remote controller or a terminal device (such as cell phone), for example, by pressing a joystick of the remote controller to control the operation of the movable platform. Since this control method does not allow a user to directly perceive operation or movement direction of the movable platform, the user's experience is not ideal.

SUMMARY

The present disclosure provides a control method, a control device, and a storage medium to improve the operation control of a movable platform.

According to a first aspect of the present disclosure, a control method for a movable platform is provided. The control method may include:

acquiring a motion scenario and/or an operating mode of a movable platform;

determining a control strategy of the motion sensing remote controller based on the motion scenario and/or the operating mode; and control the movable platform based on the control strategy.

According to a second aspect of the present disclosure, a motion sensing remote controller may include:

a processor and a memory;

wherein the memory stores a computer program; the processor for executing the computer program and, in executing the computer program, implementing a method comprising:

acquiring a motion scenario and/or an operating mode of a movable platform;

determining control strategy of the motion sensing remote controller based on the motion scenario and/or the operating mode; and control the movable platform based on the control strategy.

According to a third aspect of the present disclosure, a computer-readable storage medium is provided, and the computer-readable storage medium storing a computer program, the computer program when executed by a processor causing said processor to implement a control method for a removable platform as described in any of embodiments of the present application.

The control method, motion sensing remote controller and storage medium of the movable platform disclosed in this application embodiment can improve operational safety of the movable platform as well as improve the user's experience.

It should be understood that the above general description and the following detailed description are only exemplary and explanatory and are not restrictive of the present disclosure.

BRIEF DESCRIPTION OF THE DRAWINGS

In order to explain the technical features of embodiments of the present disclosure more clearly, the drawings used in the present disclosure are briefly introduced as follow. Obviously, the drawings in the following description are some exemplary embodiments of the present disclosure. Ordinary person skilled in the art may obtain other drawings and features based on these disclosed drawings without inventive efforts.

DETAILED DESCRIPTION

Figure 1:
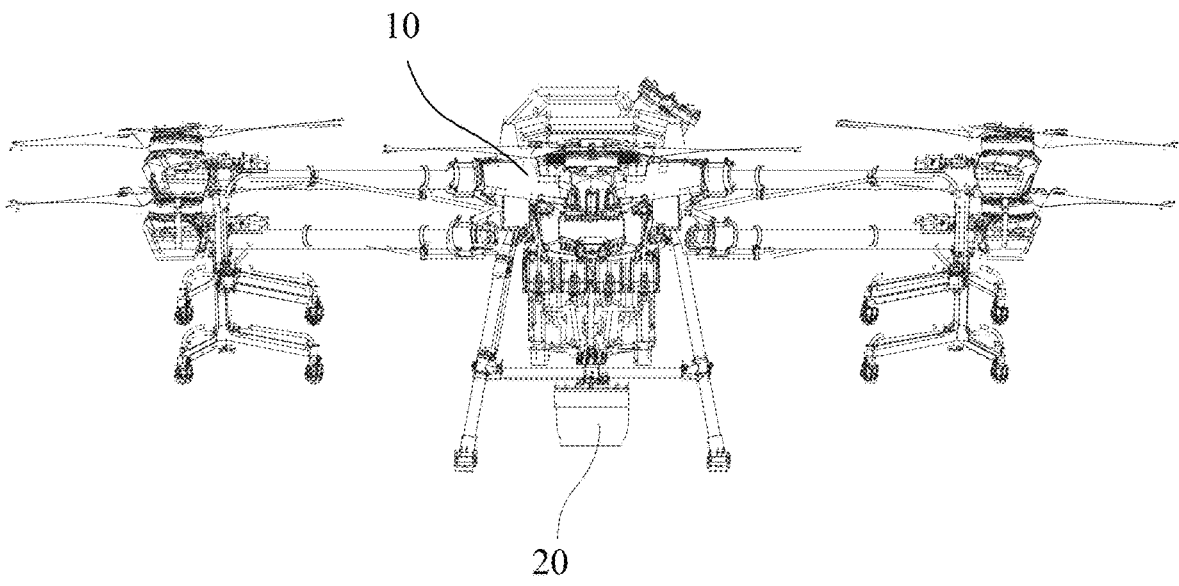
FIG. 1 is a schematic structural diagram of an unmanned aerial vehicle provided by an embodiment of the present application.

The technical solutions in some embodiments of the present application will be clearly and completely described below in conjunction with the drawings in the embodiments of the present application. Obviously, the described embodiments are part of the embodiments of the present application, not all of them. Based on the embodiments in the present application, all other embodiments obtained by a person of ordinary skill in the art without making creative labor fall within the scope of protection of the present application.

It should also be understood that the terminology used herein in the specification of this application is for the purpose of describing particular embodiments only and is not intended to limit this application. As used in the specification of this application and the appended claims, unless the context clearly indicates otherwise, the singular forms "one," "a," and "the" may be intended to include plural forms.

It is further understood that the term "and/or" as used in the specification of this application and the appended claims refers to any and all possible combinations of one or more of items listed in connection therewith, and includes such combinations.

The flowchart shown in the accompanying drawings is only an example illustration and does not have to include all of contents and operations/steps, nor does it have to be performed in the order depicted. For example, some operations/steps may also be broken down, combined or partially merged, so actual order of execution may change depending on actual situation.

At present, the movable platform is mainly operated by a remote controller or a terminal device (such as cell phone), for example, by pressing a joystick of the remote controller to control the operation of the movable platform. Since this control method does not allow users to directly perceive operation or movement direction of the movable platform, user experience is not ideal.

There has been emergence of some motion sensing control technology, such as using cameras to identify the user's gestures as control instructions to achieve control of the movable platform, or using wearable devices to identify the user's movements as control instructions to achieve control of the movable platform, or using the user's gestures on a screen of the mobile terminal as control instructions. However, these motion sensing control technologies have different problems, which affect safety of the movable platform and the user's experience.

In the following, using a drone as the example of a movable platform, the problems of these motion sensing control techniques in controlling the flight of the drone are presented.

Problem 1: it is difficult to manipulate and control the drone in dangerous flying scenarios.

Since the existing motion sensing control methods considers only when the user needs to reinitialize the attitude, the UAV is in an instantaneous balance state. On one hand, it does not take into account the dangerous situation of real-time response to relative attitude after instantaneous balance, especially in gears with greater maneuverability, such as manual gears (M gear). On the other hand, it does not take into account that in dangerous scenarios such as low battery, obstacle avoidance, and false triggering, hovering and shielding sticks are required to ensure flight safety.

Problem 2: it increases burden of a user in manipulation in normal motion scenarios.

The existing motion sensing control method is mostly always real-time response to control commands based on relative attitude conversion. However, in some normal motion scenarios (such as user-activated auto-landing, auto-return, request for braking, etc.), once the user's motion sensing control is overlaid, it increases the user's operation burden due to the nature of the motion sensing remote controller not being able to return to neutral. If the user expects to replace another user for flight operations while the drone is hovering in the air, this cannot be done.

Problem 3: when initializing the motion sensing remote controller in a large attitude, the manipulable range is limited.

The existing motion sensing control method does not consider the optimization of user manipulable range under different attitude initialization. It also does not support initialization of the attitude at every angle, and does not provide guidance and instruction to the user. As a result, the user's maneuverable range is limited due to limitation of the maneuverable range of the human hand, which makes the user's maneuverable range be limited when initializing in large attitudes.

To solve the above problems or one of the problems, some embodiments of the present application provide a control method, a motion sensing device and a storage medium for a movable platform to improve the user's experience of manipulating the movable platform and the operational safety of the movable platform.

Some embodiments of the present application are described in detail below in conjunction with the accompanying drawings. In the case of no conflict, the following embodiments and features in the embodiments can be recombined with each other.

It is to be noted that the control method of the movable platform provided in some embodiments of this application can be applied in a human motion sensing device. Among them, the movable platform includes at least one of unmanned aerial vehicles, manned aerial vehicles, robots and remote control toys, and of course can be used in other motion sensing control scenarios, such as motion sensing games. The following example is described with an unmanned aerial vehicle (UAV) as the moveable platform.

Among them, the motion sensing device includes electronic devices such as motion sensing remote controller, smart phones, tablets or wearable devices, which are equipped with attitude sensors for collecting the user's attitude, thereby facilitating the motion sensing device to generate control commands based on the collected attitude to control the operation of the movable platform. The following motion sensing device is a motion sensing remote controller as an example for description.

Figure 2:
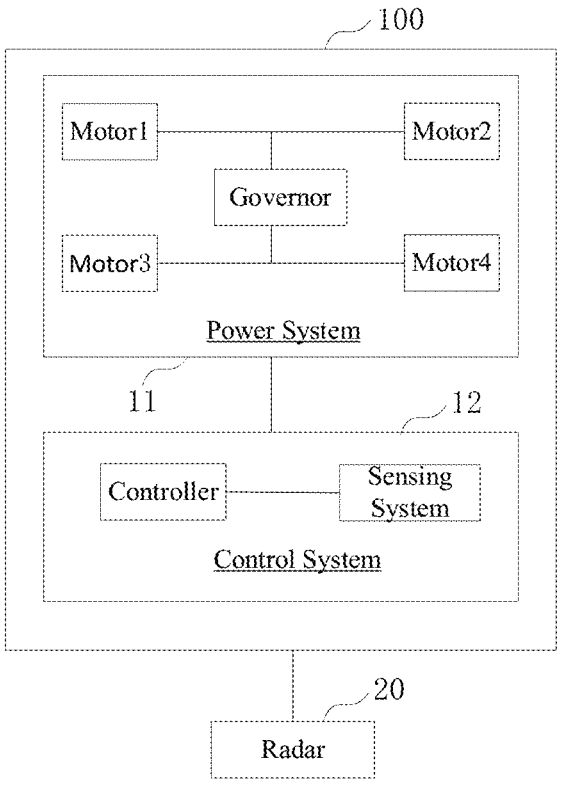
FIG. 2 is a schematic block diagram of a flight control system of an unmanned aerial vehicle provided by an embodiment of the present application.

Referring to FIGS. 1 and 2, FIG. 1 illustrates a structure of an unmanned aerial vehicle (UAV) 100 provided by an embodiment of the present application, and FIG. 2 illustrates a structural framework of a flight control system of the unmanned aerial vehicle (UAV) 100 provided by an embodiment of the present application. As shown in FIGS. 1 and 2, the UAV 100 may include a frame 10, a power system 11, a control system 12, and a radar 20.

The frame 10 may include a fuselage and a stand (also referred to as a landing gear). The fuselage may include a central frame and one or more arms connected to the central frame, with the one or more arms extending radially from the central frame. The stand is connected with the fuselage, and is used for supporting when the UAV 100 lands.

The radar 20 may be mounted on the UAV, specifically on the frame 10 of the UAV 100. The radar may be used to measure surroundings of the UAV 100, such as obstacles, during the flight of the UAV 100 to ensure safety of the flight.

The radar 20 may be installed on the stand or tripod of UAV 100, and the radar 20 may communicate with the control system 12. The radar 20 may transmit collected observation data to the control system 12 for processing by the control system 12.

It is noted that the UAV 100 may include two or more stand or tripods, with the radar 20 mounted on one of the tripods. The radar 20 may also be carried in other locations of the UAV 100, for which there is no specific limitation.

Radar 20 may include a RF front-end module and a signal processing module. The RF front-end module can include a transmitting antenna and a receiving antenna. The transmitting antenna maybe used to send a signal to a target, and the receiving antenna may be used to receive the signal reflected back by the target. The signal processing module may be responsible for generating modulation signals and processing and analyzing collected intermediate frequency signals, where the targets may be buildings, iron towers, crops, etc.

The power system 11 may include one or more electronic governors (referred to as ESCs), one or more propellers, and one or more motors corresponding to the one or more propellers, wherein the motors are connected between the ESCs and the propellers. The motors and the propellers may be provided on the arms of the UAV 100; The electronic governor may be used to receive the driving signal generated by the control system, and provide the driving current to the motor according to the driving signal to control the speed of the motor.

The motor may be used to drive the propellers to rotate so as to provide power for the flight of the UAV 100, and the power enables the UAV 100 to realize one or more degrees of freedom of movement. In some embodiments, the UAV 100 may rotate about one or more axes of rotation. For example, the axes of rotation may include a roll axis, a yaw axis, and a pitch axis. It should be understood that the motor may be a DC motor or a permanent magnet synchronous motor. Alternatively, the motor may be a brushless motor or a brushed motor.

The control system 12 may include a controller and a sensing system. The controller may be used to control the flight of the UAV 100, for example, the flight of the UAV 100 may be controlled based on attitude information measured by the sensing system. It should be understood that the controller may control the UAV 100 in accordance with pre-programmed instructions. The sensing system may be used to measure attitude information of the UAV 100, i.e., position information and state information of the UAV 100 in space, e.g., three-dimensional position, three-dimensional angle, three-dimensional velocity, three-dimensional acceleration, and three-dimensional angular velocity.

The sensing system may include, for example, at least one of a gyroscope, an ultrasonic sensor, an electronic compass, an inertial measurement unit (IMU), a vision sensor, a global navigation satellite system, and a barometer, among other sensors. For example, the global navigation satellite system may be the Global Positioning System (GPS).

The controller may include one or more processors and memory. The processor may be, for example, a Microcontroller Unit (MCU), a Central Processing Unit (CPU), or a Digital Signal Processor (DSP). The memory can be a Flash chip, a Read-Only Memory (ROM) disk, a CD-ROM, a USB stick or a removable hard disk, etc.

The UAV 100 may include a rotor-type UAV, such as a quad-rotor UAV, a six-rotor UAV, an eight-rotor UAV, or a fixed-wing UAV, or a combination of a rotor-type and a fixed-wing UAV, without limitation herein.

Figure 3:
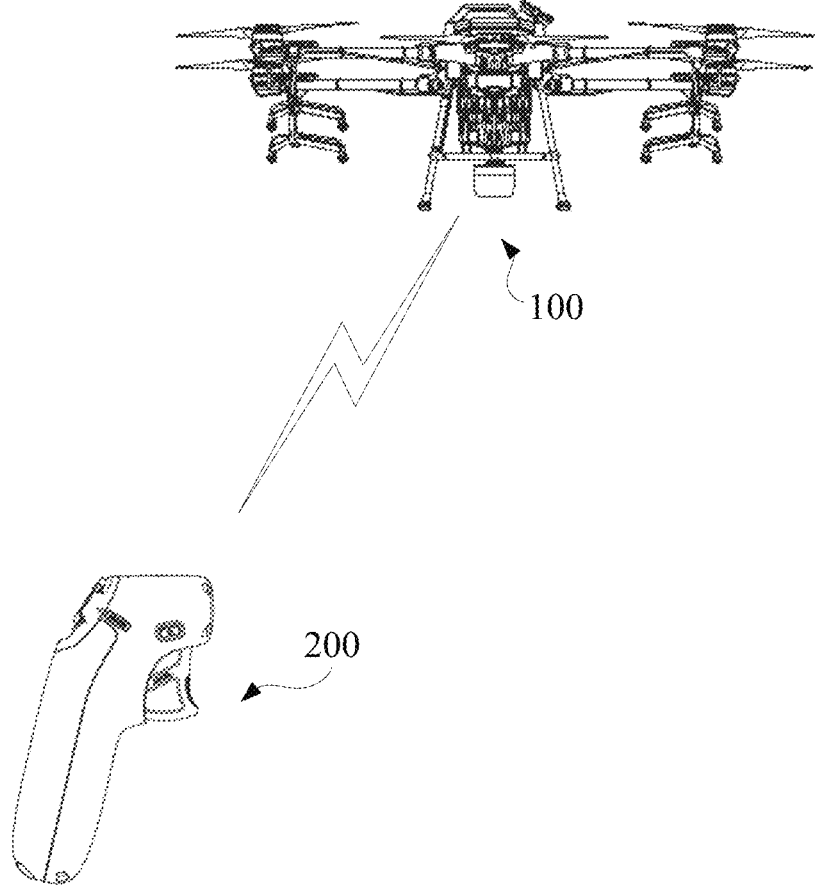
FIG. 3 is a schematic structural diagram of a flight system provided by an embodiment of the present application.

As shown in FIG. 3, FIG. 3 illustrates a structure of a flight system provided by an embodiment of the present application, the flight system comprising a UAV 100 and a motion sensing remote controller 200. The motion sensing remote controller 200 may be the ground end of the flight system located at the ground end of the flight system and can communicate with the UAV 100 wirelessly for remote manipulation of the UAV 100 based on its attitude information.

It should be understood that the above naming of the components of the UAV 100 is for identification purposes only and should not be construed as limiting the embodiments of this specification.

In some embodiments of the present application, the motion sensing remote controller can be used to perform the control method of the movable platform as described in any of embodiments of the present application to improve the user's control experience of the movable platform and safety of the operation of the movable platform.

Figure 4A:
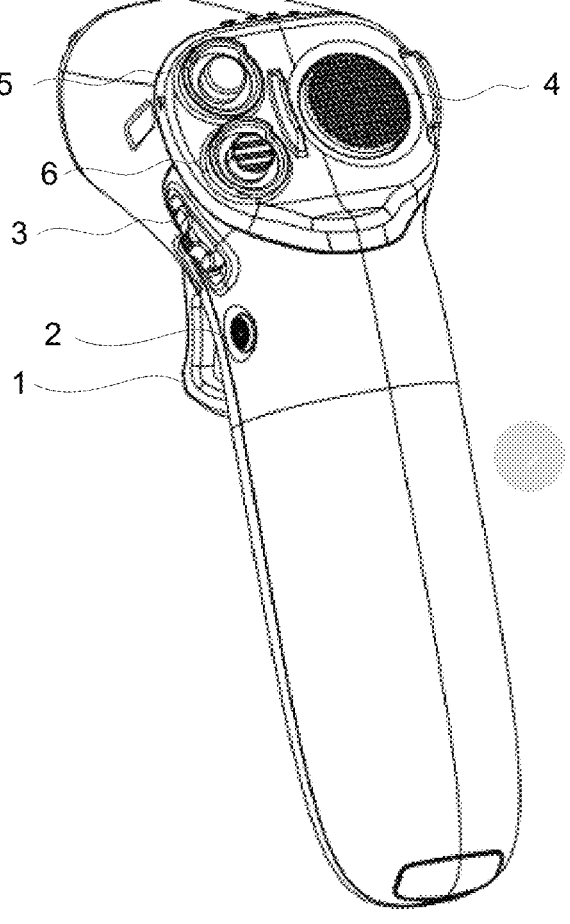
FIGS. 4a to 4c are schematic structural diagrams of a motion sensing remote controller provided by an embodiment of the present application.
Figure 4B:
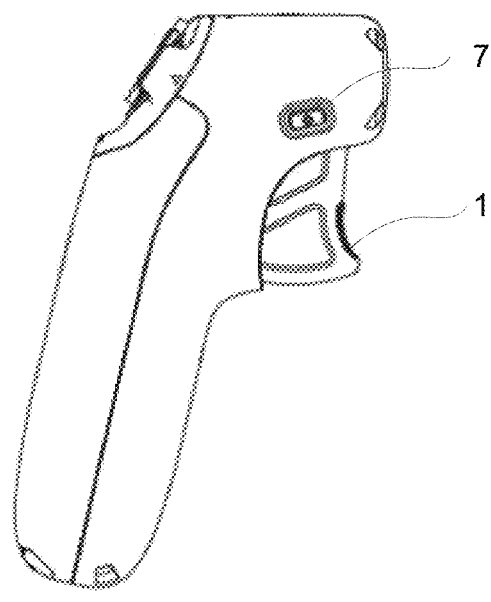
Figure 4C:
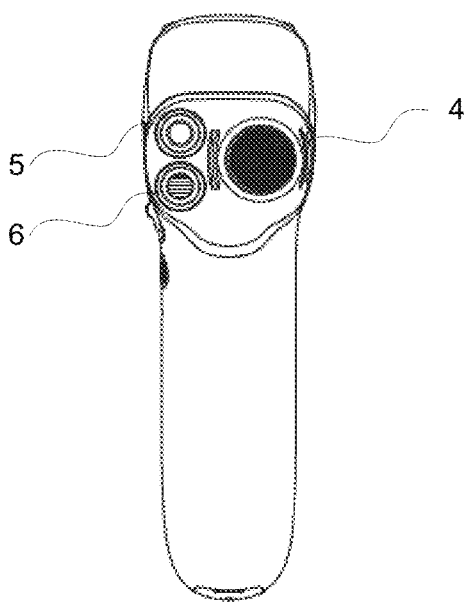

Before introducing the control method of the movable platform, the structure of the motion sensing remote controller 200 and the control principle are introduced. In some embodiments, as shown in FIG. 4a to FIG. 4c, the motion sensing remote controller 200 may include: throttle lever 1, video button 2, gimbal button 3, brake button 4, plus unlock button 5, mode switch button 6 and on/off button 7. Different buttons may have different functions when the motion sensing remote controller is in different operating modes, as shown in Table 1. Among them, the different operating modes may include at least a first operating mode and a second operating mode, specifically the first operating mode can include a A/P/M mode, and the second operating mode can include a flashlight mode.

TABLE 1 functions of different buttons of the motion sensing remote controller in different operating modes.

| Button | button Name | First operating mode (A/P/M) | Second operating mode (Flashlight mode) |
|---|---|---|---|
| 1 | Throttle lever | Control vertical speed | Control speed at flight direction |
| 2 | Video button | Start and end video recording | |
| 3 | gimbal Button | Control direction of the gimbal | |
| 4 | Brake button | Short press: Brake Long press: request return Short press during return/landing: exit return/landing | Short press: Brake (lock) Short press in brake: Unlock Long press: request return Short press during return/landing: exit return/landing |
| 5 | Plus unlock button | Single Click: Start propeller Single Click at ground: Stop propeller Single Click in air: Request to land Single click in air (aircraft recently malfunctioned): Emergency stopping of propeller | Double click: start propeller Double click at ground: Stop propeller Long press: automatic take-off, hovering at 1.2 m Double click in air: request to land Double-click in air (aircraft recently malfunctioned): Emergency stopping of propeller |
| 6 | Mode switch button | Single Click: Switch mode | |
| 7 | on/off button | Short press + long press: Power on Short press + long press: Shutdown | |

It should be noted that the ground and air in "click at ground" and "click in air" in Table 1 refer to the drone 100 controlled by the motion sensing remote controller 200 being on the ground and in the air, respectively, "aircraft" means UAV, and the mode in "switch mode" can be the operating mode of the motion sensing remote controller, or other modes, such as different flight modes of the drone.

It should also be noted that the buttons of the motion sensing remote controller 200 are not limited to the functions in Table 1. For example, the on/off button 7 can also perform some or all of the functions of the Plus unlock button 5. Alternatively, it can be said that the functions in Table 1 can also be performed in other ways. For example, the automatic takeoff trigger can be "after starting the propeller, pull the throttle lever 1 to the middle position and above (A/P/M)."

The control strategy of the motion sensing remote controller is different in different operating modes; the control strategy of the motion sensing remote controller is different in different gears in the same operating mode; wherein the different gears include at least a first gear, a second gear and a third gear.

The control strategy of the motion sensing remote controller 200 differs in different operating modes and in different gears of the same operating mode, as shown in Table 2.

TABLE 2

| control strategies in different gears. | |
|---|---|
| Gear | Control Strategy |
| First gear (A grade) | 1. Remote controller to yaw: aircraft to yaw. 2. Remote controller to roll: aircraft to roll. 3. remote controller turns yaw and roll at the same time: the aircraft turns in coordination. 4. Remote controller to pitch: aircraft flight forward. 5. Remote controller to pull the throttle. (1) Below the middle: aircraft flying vertically downward. (2) middle: aircraft hovering in vertical direction. (3) Above the middle: aircraft flying vertically upward. |
| Second gear (M grade) | 1. Remote controller to yaw: aircraft to yaw. 2. remote controller to roll: the aircraft has a roll angular velocity, and it stops rotating when it returns to the center. 3. the remote controller turns yaw and roll at the same time: the aircraft turns in coordination. 4. remote controller to pitch: aircraft pitch keeps rotating around the y axis of the body. 5. Remote controller to pull throttle: motor acceleration. |
| Third gear (P) | 1. Remote controller to yaw: aircraft to yaw. 2. Remote controller to roll: aircraft to fly sideways. 3. remote controller turns yaw and roll at the same time: the aircraft turns in coordination. 3. Remote controller to pitch: aircraft flight forward 4. Remote controller to pull the throttle. (1) Below the middle: aircraft flying vertically downward. (2) middle: aircraft hovering in vertical direction. (3) Above the middle: aircraft flying vertically upward. |
| Flashlight mode | 1. Remote controller to yaw: aircraft to roll. 2. Remote controller to roll: aircraft to yaw. 3. Remote controller to pitch: The gimbal faces the direction pointed by the pitch, if the throttle is pulled, the aircraft will fly in the direction pointed by the pitch. 4. Remote controller to pull throttle: If the throttle is not pulled, the flying speed of the aircraft is 0, hovering in both horizontal and vertical directions; if the throttle is pulled, the aircraft is mapped to the speed of flying in the specified direction according to the degree of pulling the throttle. |

Figure 5:
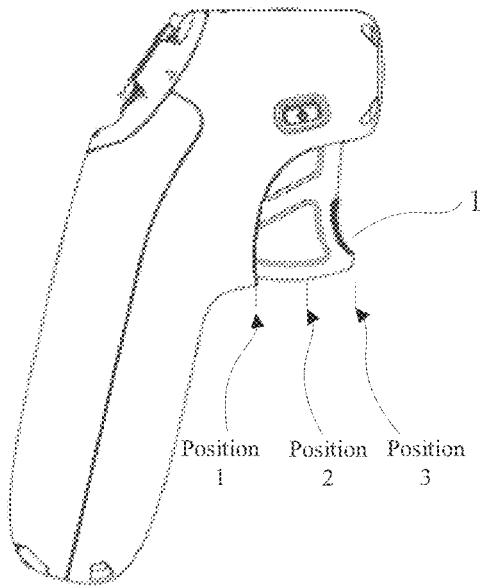
FIG. 5 is a schematic diagram of positions of a throttle lever of a motion sensing remote controller provided by an embodiment of the present application.

It should be noted that in Table 2, "remote controller" refers to the motion sensing remote controller 200, "aircraft" is the UAV 100, and that the throttle lever 1 is located in different positions, indicating different throttle amounts. Specifically, as shown in FIG. 5, according to the position of the throttle lever 1, it can be divided into "low position", "middle position" and "high position", respectively, corresponding to position 1, position 2 and position 3, representing different throttle levels. Of course, it can also be divided into more or less levels to represent different throttle levels.

It should be noted that the main difference between A and P gears is that the P gear releases the lever (throttle lever), UAV can hover, while the A gear releases the lever (throttle lever), the UAV cannot hover, same as an ordinary remote controller.

In addition, the motion sensing remote controller 200 provided by some embodiments of this application is distinguished from the existing ordinary remote controller, as shown in Table 3, wherein the motion sensing remote controller in Table 3 is the motion sensing remote controller 200 provided by one embodiment of this application, and the ordinary remote controller is the remote controller distinguished from this motion sensing remote controller 200, such as a remote controller having a joystick.

TABLE 3

| difference between a motion sensing remote controller and an ordinary remote controller. | |
|---|---|
| Ordinary remote controller | Motion sensing remote controller |
| 1. Directly use the joystick position of the remote controller as a control command | 1. Use the posture information of the remote controller as a control command |
| 2. Use absolute position of remote controller as control command | 2. Use relative attitude of the remote controller as the control command |
| 3. Loosening the stick will trigger the horizontal and vertical sticks to return to the center (the vertical stick of the traversing machine will not return to the center) | 3. Loosening the stick will trigger the vertical stick to be in a low position, while the horizontal stick depends on the attitude information of the current motion sensing remote controller |
| 4. Two-handed operation | 4. One-handed operation |
| 5. the stick amount in a certain direction corresponds to the attitude command of the aircraft in a certain direction. | 5. The attitude of holding the motion sensing remote controller directly corresponds to the movement of the aircraft. |

It should be noted that, when the user sends control instructions to the UAV through the remote controller, two kinds of operational behaviors can be used to generate corresponding control instructions and send them to the UAV. For an ordinary remote controller, it can return to the physical neutral position. In the P/A grade mode, both sticks can return to the center position. In the M grade mode, the throttle stick generally does not return to the center position. For the motion sensing remote controller, it can be realized with only one trigger button (throttle stick) and the attitude information of the remote controller. A trigger for loosening the lever (throttle stick) is located at one end, and there is no fixed neutral position in the middle. The user's control instructions depend on the attitude information of the motion sensing remote controller.

Compared to ordinary remote controllers, the motion sensing remote controllers use their attitude information as control commands or use the relative attitude of the remote controller as control commands.

In summary, the use of the motion sensing remote controller 200 provided in some embodiments of this application allows the user to control the drone with one hand, as well as a more intuitive feeling of the flight of the drone.

In order to provide the user with the experience of controlling the drone 100 via the motion sensing remote controller 200, and to improve flight safety of the drone 100, different control strategies may also be set for the motion sensing remote controller 200 in some embodiments of the present application to control the drone 100 in different movement scenarios, and in different operating modes of the drone 100, using different control strategies for the drone. The different control strategies correspond to different locking states, which include at least one of a fully locked state, a semi-locked state and an unlocked state. In turn, the user experience and the flight safety of the UAV 100 are improved.

The different control strategies include at least a first control strategy, a second control strategy, and a third control strategy, wherein the first control strategy may be used to control the motion sensing remote controller in a fully locked state, the second control strategy may be used to control the motion sensing remote controller in a semi-locked state, and the third control strategy may be used to control the motion sensing remote controller in an unlocked state.

The fully locked state: shielding the motion sensing remote controller from sending the current real stick amounts to the drone. For example, it means sending the control command corresponding to all stick amounts located at the middle position to the drone. The current real stick amounts may include a horizontal stick amount and a vertical stick amount, and the all stick amounts may include a horizontal stick amount and a vertical stick amount.

The semi-locked state: shielding the motion sensing remote controller from sending the current horizontal stick amount to the UAV. For example, it means sending the control command corresponding to the horizontal stick amount located at the middle position and the control command corresponding to the current throttle stick amount to the UAV.

The unlocked state: sending the control command corresponding to the current horizontal stick amount and the control command corresponding to the current throttle stick amount to the UAV.

It is important to note that the stick amount at the middle position can be understood as that the current stick amount is the initial attitude position. For example, the horizontal stick amount within a certain preset range can be understood as "middle position". The current stick amount can be interpreted as a variable relative to the "middle" position.

However, for the throttle lever at the middle position, it means that the throttle lever is in the middle position, and the middle position can ensure safe flight of the UAV.

It is also important to note that in one embodiment of this application, there is no absolute "middle" position. For example, the attitude information at the moment of unlocking can be used as the middle position for each attitude amount (different stick amounts, horizontal or vertical stick amounts).

In one embodiment of the present application, the main control logic of the motion sensing remote controller can also be limited to improve the experience of user control, such as limiting the control logic from fully locked to unlocked or limiting the control logic for different gears of take-off, etc.

First, corresponding control logic from a fully locked state to an unlocked state: in this control logic, the absolute attitude of the motion sensing remote controller can be controlled within a certain range, as well as the throttle pulls above the hovering position. The hovering position refers to the stick amount corresponding to the throttle lever that the UAV can hover in the vertical position, specifically realized in the A/P/M gear. It can be realized by loosening the throttle lever in the flashlight mode. For the specific purpose of optimizing user operation, the source of the control command corresponding to the horizontal stick amount given by the motion sensing remote controller is a relative attitude, which is the attitude relative to that at the moment of unlocking.

For most users, it is expected that the attitude at the moment of unlocking should be located at a midpoint of the ground coordinate system as much as possible, that is, within a certain attitude range that is easy to adjust, such as an attitude close to the flat end of the hand, which is convenient for subsequent operations. Optionally, it can be understood that unlocking is only allowed within a certain range of attitude. For example, if the attitude when unlocking is biased towards a certain direction, due to the limitation of the rotation angle of the user's wrist, subsequent operation instructions will be restricted. The unlocking includes from a fully locked state to an unlocked state, or from a semi-locked state to an unlocked state; locking includes from an unlocked state to a fully locked state, or from an unlocked state to a semi-locked state.

For example, assuming that the normal user's pitch angle control range is [45, −45], if the motion sensing remote controller is allowed to have a larger pitch angle with a lower head such as 30 degrees when unlocking, the subsequent angle range that can be operated becomes [15, −75], thereby restricting the forward flight command.

On the other hand, when changing from a fully locked state to an unlocked state, the motion sensing remote controller will record the absolute attitude at the current moment, and use it as an "initialization attitude" for the corresponding adjustment of the difference between the absolute attitudes of the motion sensing remote controller during subsequent manipulations. The difference, which is used in the conversion calculation of the stick amount, is used to generate the control command for controlling the UAV.

Therefore, the user only needs to hold the motion sensing remote controller relative to his or her attitude at the moment of unlocking, instead of sticking to the absolute horizontal position, as long as the horizontal position is within a certain range of attitude at the moment of unlocking, which simplifies the user's operation and avoids the problem of absolute horizontal position judgment that prevents the user from unlocking, thus making the user's operation more natural.

In addition, it can also enhance flight safety of the drone. When the stick amount of the motion sensing remote controller enters the unlocked state, it will immediately send the real vertical stick amount and horizontal stick amount to the drone. In order to ensure that the moment when the user obtains the control, there will be no danger of sudden changes in altitude, it can also be unlocked immediately when it is detected that the current throttle is pulled to the position corresponding to the hovering position. That is, when the throttle is pulled to the position of the hovering throttle, it will be unlocked immediately. The immediate unlocking is specifically to control the motion sensing remote controller to enter the unlocked state, and it is specifically realized in the A/P/M gear. This enables a smooth transition to respond to user commands, thus improving flight safety as well as user experience.

It should be noted that the position of the hovering throttle varies with the current flight mode of the drone. For example, in the mode corresponding to the M gear, the position of the hovering throttle lever depends on the current flight altitude. For another example, in the mode corresponding to the A/P gear, the position of the hovering throttle level depends on the actual position of the throttle stick (that is, the physical middle position).

Second, take-off logic of different gears (to distinguish between M gear and non-M gear take-offs):

For M gear, the vertical stick amount directly controls the throttle, and the throttle is 0 when the stick amount is in the low position; for non-M gear, the vertical stick amount controls the position or speed (P/A) in the vertical direction, and the stick amount in the middle position means no vertical control command, the stick amount below the middle position means vertical downward control command, and the stick amount above the middle position means vertical upward control command. Therefore, for these two vertical control strategies, different locking methods are required, and the main difference is the locking state after the propeller starts at the ground.

(1) M Gear: Send Control Commands for Real Horizontal Stick Amount and Real Vertical Stick Amount:

It can improve flight safety. For M gear, if the real throttle stick amount (vertical stick amount) is not sent after the propeller is raised, the throttle stick amount located at the middle position is equivalent to giving a large throttle control value. Accordingly, it is easy to have a rapid takeoff and rise immediately after the propeller is raised, which is more dangerous. However, using the real vertical stick amount can avoid this problem.

(2) Non-M Gear: Send Control Commands for Real Horizontal Stick Amount and Vertical Stick Amount at the Middle Position:

It is possible to optimize the operation. For non-M gears, if the control command corresponding to the real horizontal stick amount is sent after the propellers are started, when the user defaults to release the throttle to the low position at the beginning, it is easy to cause the propellers to stop after starting the propellers. Because after starting the propellers, pulling the throttle to the low position is a control command to request the propellers to stop. In order not to require the user to have the throttle above the middle position when raising the propellers and accordingly reduce the operating burden, the vertical stick amount is first shielded when the propellers are raised, that is, the control command of the vertical stick amount at the middle position is sent to the drone. When the throttle is pulled above the middle position, the UAV is unlocked and sent the actual throttle stick amount, and takes off.

Based on the above settings of the motion sensing remote controller, the corresponding control strategy can be determined by the motion sensing remote controller when the UAV is in different motion scenarios or different operating modes of the UAV. The flight control of the UAV can be realized based on the control strategy, thereby improving user experience and operational security.

The motion scenario may include at least one of auto-return, auto-landing, active braking, hovering, forced landing, two-stage landing, and dangerous scenarios. The dangerous scenarios may include scenarios such as loss of control, low battery forced landing, and passively triggered braking such as obstacle avoidance. For example, the motion scenario includes at least one of auto-return, auto-landing, active braking, hovering, forced landing, two-stage landing, and dangerous scenario, and the dangerous scenario includes at least one of a loss of control scenario, a low power forced landing scenario, and a passively triggered braking scenario. The operating mode of the UAV may include switching modes, such as flight mode switching, etc., and then, for example, mode switching operation of the motions sensing remote controller. Active braking may refer to the braking triggered actively by the user, such as the braking triggered by the user pressing the brake button of the motion sensing remote controller, which is called active braking.

When detecting that the drone is currently under different flight scenarios, the motion sensing remote controller may select different control strategies and enter the corresponding locked state to control the drone flight, which can improve flight safety as well as user experience.

In one embodiment, obtaining a motion scenario and/or an operating mode of the movable platform; determining a control strategy for the motion sensing remote controller based on the motion scenario and/or the operating mode, and controlling the motion sensing remote controller in a corresponding locking state based on the control strategy; controlling the movable platform in the locking state; wherein the locking state comprises at least one of a fully locked state, a semi-locked state, and an unlocked state.

In some embodiments, the following is a description of the control strategy executed by the motion sensing remote controller when switching modes in auto-return/auto-landing.

(1), when the UAV is detected to be in auto-return or auto-landing, control the motion sensing remote controller to execute the first control strategy, that is, entering the fully locked state.

During the auto return/auto landing, the ordinary remote controller allows the stick amounts to be superimposed, which easily results in sending commands in multiple directions at the same time when the stick amounts are superimposed and requires further combination with the actual return/landing direction, thereby increasing the user's control difficulty. The user who invokes auto-return/auto-landing is usually a novice or a user who wants to reduce the control burden.

However, for the motion sensing remote controller according to one embodiment of this application, because it is in the fully locked state, it will not automatically return to the middle positions of the horizontal stick amount and the throttle stick amount. Thus, in order to facilitate the user's control in auto return/auto landing, for example, this method does not allow the user to superimpose the stick amounts, or allows the user to perform a small stick amount superimpose, or allows the user to perform a stick amount superimpose on a specific flight path. The specific flight path may be a return path, etc. Therefore, no overlay control is created. If the user wants to change the flight speed, they can exit the auto-return/landing and then unlock the controller again.

(2), It is detected that the user performs a mode switching operation on the motion sensing remote controller, and the motion sensing remote controller is controlled to execute the first control strategy, that is, entering the fully locked state.

If the mode is not locked after switching, the horizontal position of the aircraft will change abruptly immediately after switching to some modes that cannot lock the position of hovering (such as A gear). If the mode is not locked after switching, and the motion sensing remote controller will not automatically return to the middle position. When the mode is switched, the user needs to immediately switch the operation mode. Because the user is one-handed operation, the user needs to switch the mode first, and then starts to control the flight, thus increasing the user's control difficulty.

In order to give the user a preparation time, especially when switching to some operationally difficult flight modes, controlling the motion sensing remote controller into a fully locked state after switching modes will cause the drone to hover first and enter a fully locked state of the motion sensing remote controller.

It should be noted that the mode switching operation may include the mode switching operation of the motion sensing remote controller in addition to the flight mode switching of the UAV, i.e., the switching mode includes at least one of: the flight mode switching of the movable platform and the mode switching operation of the motion sensing remote controller.

(3) When the user is detected to brake the UAV through the motion sensing remote controller, the motion sensing remote controller is controlled to execute the first control strategy, i.e., entering the fully locked state.

The braking of the ordinary remote controller is only performed in the horizontal direction, because the throttle of the ordinary remote controller is automatically returned to the center to set the height. However, if the motion sensing remote controller only brakes in the horizontal direction, the user will first press the brake button and then start to control the throttle lever because the user is operating with one hand.

On the one hand, controlling the throttle lever will increase the user's operation burden, on the other hand, during the time between pressing the brake button and starting to control the throttle, the drone may fall height, or the drone suddenly climbs up, which are very dangerous. Therefore, by controlling the motion sensing remote controller to enter the fully locked state, the braking of the motion sensing remote controller will trigger both horizontal and throttle brakes. The user can unlock to take over the control at any time after the brake is completed.

The following mainly introduces the following dangerous scenarios, which mainly include loss of control, low battery forced landing, obstacle avoidance and other passively triggered braking scenarios.

(1), Loss-of-Control Scenarios.

For loss of control: when the drone is detected to be in a loss of control scenario, the motion sensing remote controller is controlled to enter the fully locked state.

After a loss of control, the drone will hover both vertically and horizontally immediately, which is the same requirement for the motion sensing remote controller and the ordinary remote controller. The difference is that after recovering from a loss of control, the ordinary remote controller will immediately respond to the current remote control commands. However, if the motion sensing remote controller immediately responds to the current remote controller's command, there will be two problems: one is that the control command sent by the motion sensing remote controller is derived from a relative posture, relative to the posture at the moment of unlocking, which occurs before the drone loses control. Thus, it is difficult for the user to find the attitude accurately, and therefore difficult to perform the desired control. The other is that due to the complexity of its own operation, the motion sensing remote controller may have a greater flight risk due to unresponsive response or in a more difficult-to-control flight mode (such as M gear) when it immediately takes over the control. Therefore, after the loss of control is recovered, the motion sensing remote controller will first be in fully locked state to keep hovering and remind users that they can take over the control by unlocking.

Optionally, the loss of control means that the drone is disconnected from communication with the motion sensing remote controller and the drone cannot be controlled by the motion sensing remote controller.

(2), Forced Landing Scenarios.

For forced landing: when the drone is detected to be in forced landing, the motion sensing remote controller is controlled to enter the fully locked state.

When the aircraft is low on power, a non-cancelable forced landing is triggered to prevent the power from running out, and when it is severely low on power, it will not respond to the user's control command of vertical stick amount, but only to the user's control command of horizontal stick amount. The landing process is different from the normal automatic landing strategy because the landing process is non-exitable, and the user is allowed to control horizontally in dangerous situations where obstacle avoidance is required. A full lock will be performed first, and then unlocking and controlling the aircraft will be allowed during the landing process, i.e., during the landing of the UAV, the user will be allowed to unlock and control the UAV based on the user's unlocking operation for the motion sensing remote controller.

(3), Passive Braking Scenarios.

For passive braking: when the drone is detected to be in passive braking, the motion sensing remote controller is controlled to enter the fully locked state.

By controlling the motion sensing remote controller to enter a fully locked state, it is realized that the passive braking of the motion sensing remote controller will trigger both horizontal and throttle braking, and the user can unlock to take over the control at any time after the passive braking is completed, with specific reference to the description of the user manually braking the UAV as described above. That is, if the dangerous scenario is passively triggered braking, the motion sensing remote controller is unlocked according to the user's unlocking operation after the braking.

It should be noted that in some embodiments of the present application, unlocking means changing from a fully locked state to an unlocked state, or from a semi-locked state to an unlocked state; accordingly, locking means changing from an unlocked state to a fully locked state, or from an unlocked state to a semi-locked state.

Among them, the unlocking operation corresponds to different operation methods in different gears and different operating modes; the locking operation corresponds to different operation methods in different gears and different operating modes.

The operation of locking and unlocking operations in different gears and corresponding related concepts are described as follows.

(1), Under A/P/M Gears.

Locking (locking operation): press the brake button; Unlocking operation: when the remote controller is flat, the throttle returns to the vertical hovering position and above, and the flatness can be understood as within a certain range of attitude angles. The vertical hovering position under the A/P gear: the physical position of the throttle level in the middle position; the vertical hover position in M gear: the throttle position that enables the aircraft to hover; initialized attitude at unlocking: reset the zero value of yaw, roll, and pitch with the attitude of the remote controller when unlocking.

(2), Flashlight Mode.

Locking (locking operation): press the brake button; Unlocking operation: press the brake button again with the remote controller being flat; Initializing attitude when unlocking: reset the zero value of yaw with the attitude of the remote controller when unlocking.

Figure 6:
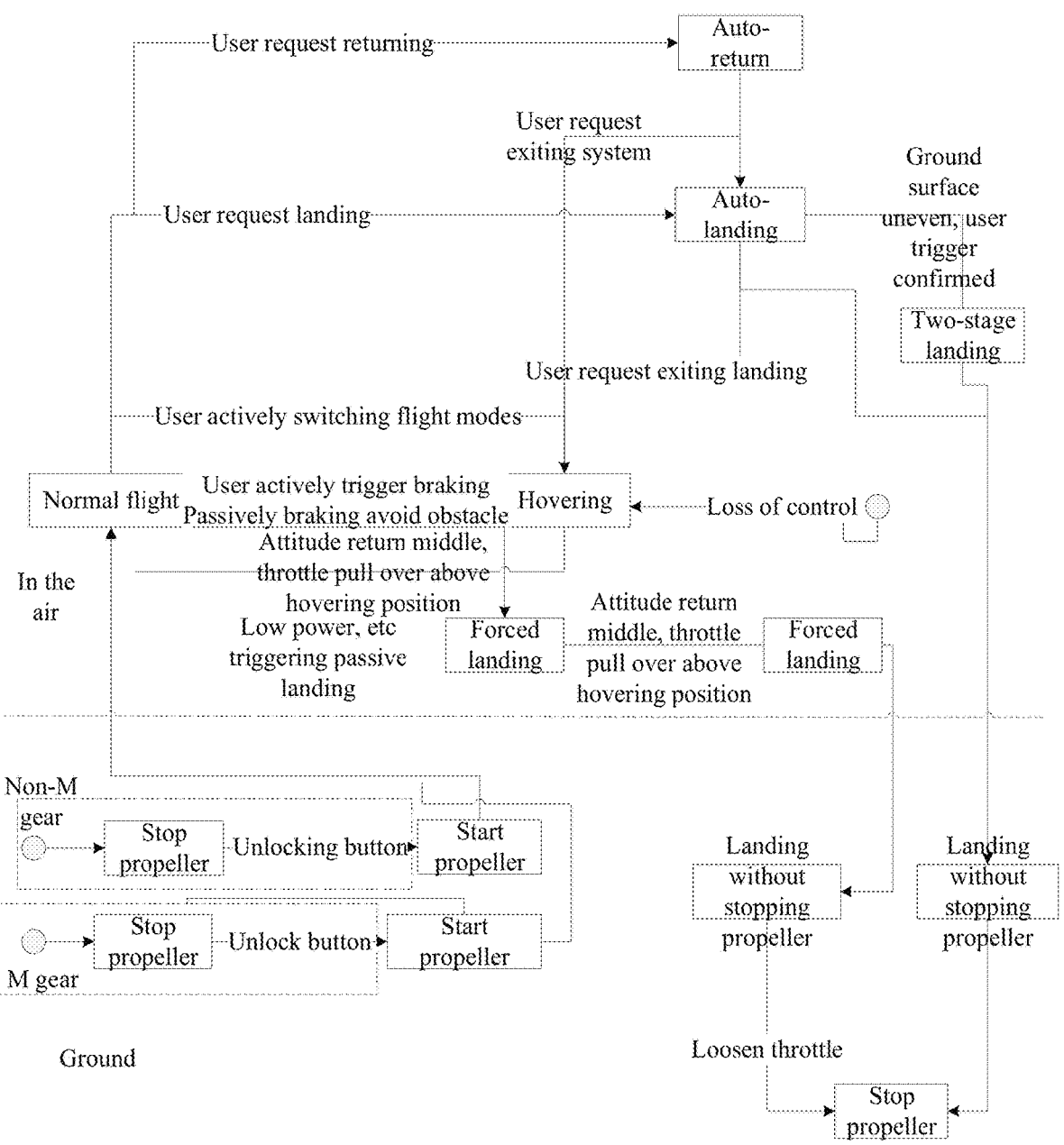
FIG. 6 is a schematic flowchart of a method for controlling a movable platform provided by an embodiment of the present application.

In some embodiments, based on the above settings, the control method of the UAV is shown in FIG. 6. The "ground" in FIG. 6 refers to the control method of the motion sensing remote controller 200, and the "air" refers to the control method of the UAV 100. Among them, the motion sensing remote controller 200 includes M gear and non-M gear. In the M gear, stopping the propeller is in a fully locked state, and starting the propeller is in an unlocked state; in the non-M gear, stopping the propeller is in a fully locked state, and starting the propeller is in a semi-locked state. The semi-locked state is the semi-locked state of the motion sensing remote controller 200 only when the propellers are lifted from in the M gear on the ground.

During the normal flight of the UAV, the motion sensing remote controller 200 is in the unlocked state, i.e., it is necessary to control the motion sensing remote controller 200 to change from the semi-locked state or the fully locked state to the unlocked state during the time from the takeoff to the normal flight.

When some motion scenarios occur during normal flight, i.e. different flight scenarios, it is necessary to control the motion sensing remote controller 200 to change from the unlocked state to the fully locked state, i.e. flight scenarios such as auto-return, auto-landing, hovering, forced landing and two-stage landing in FIG. 6. Among them, two-stage landing is an automatic landing, which refers to the second landing triggered by the user due to some reasons (such as uneven ground).

Among them, from the second stage of landing to landing without stopping the propellers and to stop the propeller, it is necessary to control the motion sensing remote controller in a fully locked state.

From the forced landing to the landing without stopping the propellers, the motion sensing remote controller may be unlocked, that is, controlling the motion sensing remote controller to change from the fully locked state into the unlocked state.

By controlling the UAV through the above control methods, the flight safety of the UAV can be improved, and the user experience of operating the UAV can also be enhanced.

In some embodiments, in order to enhance the user's maneuverability and flight safety, this application adopts a stick amount optimization scheme for the control strategy of the motion sensing remote controller, i.e., full shielding and/or partial shielding, where the full shielding corresponds to a fully locked state and the partial shielding corresponds to a semi-locked or unlocked state. In addition to this, other approaches can be used.

(1), Adopt a Method of Weakening Stick Amount Effect.

Mode 1, only support partial shielding, in addition to the application mentioned all shielding and shielding only the horizontal stick amount, but also shielding only the vertical stick amount; Mode 2, only support all shielding; Mode 3, not using the absolute shielding method, the absolute shielding method is the above shielding methods, but by adjusting the parameters to weaken the response stick amount sensitivity (such as filtering) and response range (such as dead zone).

(2) Adopt a Method of Optimizing the Stick Amount Manipulation to Reduce the Burden of User Manipulation.

Mode 1, the user can only control a single direction (roll, pitch, yaw, flight speed direction); Mode 2, the user can only control the degree of operation, rather than the absolute amount of stick (such as return speed increase or decrease); Mode 3, it is not mandatory to intervene in the user's stick amount manipulation, and the user's manipulation guidance and suggestions are given through an UI interface It is important to note that behavior parameters for the above stick amount weakening and optimization can be configured by the user.

(3), Increase the Shielding Stick Amount in Other Dangerous and Optimized Manipulation Scenarios (User Active+ Passive Control Scenarios), that is, the Way the Stick Amount is Operated in a specific scenario.

Mode 1, fixed height motion scenarios, only shielding the vertical stick amount; Mode 2, when some dangerous actions are suddenly stopped (such as one-button somersaults supported by M gear), shielding all stick amount; Mode 3, it can support user configuration. In some custom sports scenarios (i.e. the flight attitude exceeds a certain angle), shielding all stick amount.

(4) Expand the Absolute Attitude Limit Required when Unlocking, Specifically, Increase the limit range of absolute attitude.

In some embodiments, control may also be achieved by setting up a UI interface, specifically displaying an operation control page for the movable platform, the operation control page comprising an attitude indication icon for the motion sensing remote controller, the attitude indication icon being used to indicate attitude information for the motion sensing remote controller.

In some embodiments, the attitude indication icon includes a slider bar, a slider located on the slider bar, a first region, a second region and a first icon, the first icon is located in the first region, and the second region is located in the center of the first region, the slider bar and the slider located on the slider bar are used to indicate the horizontal rotation direction of the motion sensing remote controller, and the position of the first icon in the first area is used to indicate the tilt direction of the motion sensing remote controller in the pitch direction and the roll direction. In another embodiment, when the movable platform stops moving, the attitude indication icon also shows a second icon which is used to indicate that the movable platform stops moving. Wherein, when the first icon is located in the second area, it indicates that the roll angle and the pitch angle of the motion sensing remote controller are zero and the motion sensing remote controller is in a horizontal state. The first icon can be a dot, or of course other shapes.

Figure 7:
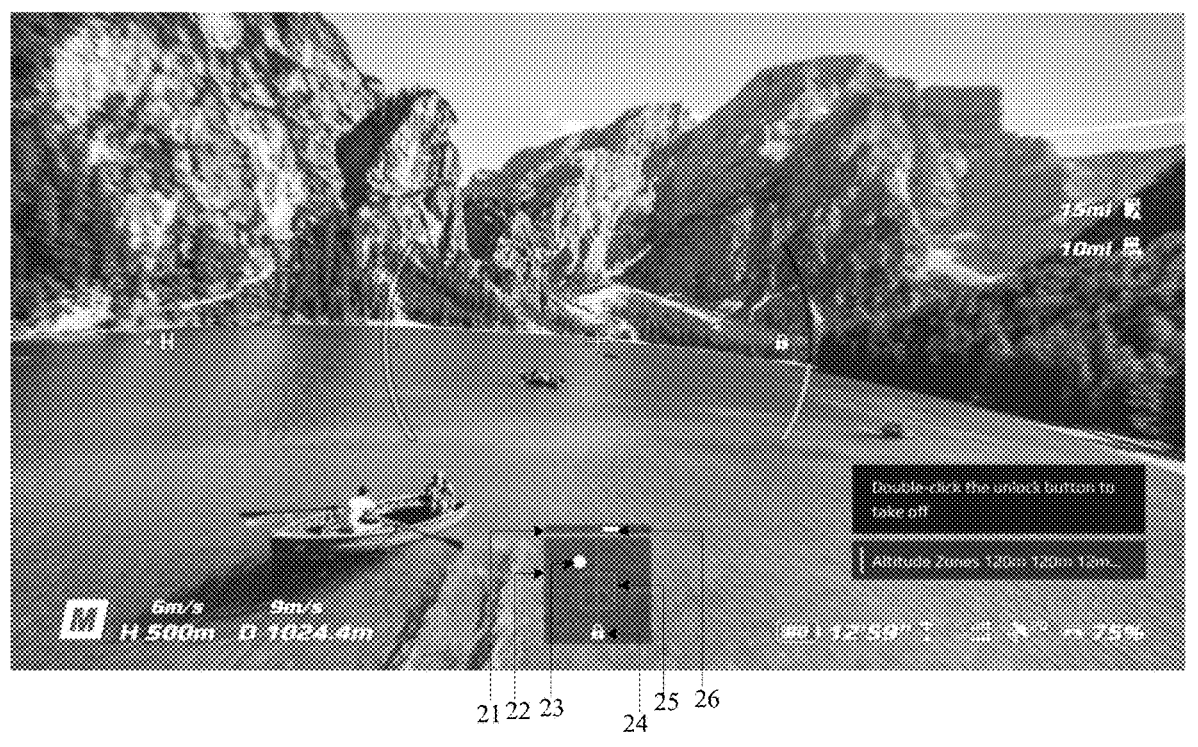
FIG. 7 is a schematic diagram of the operation control page of a movable platform in an embodiment of the present application.

Exemplarily, as shown in FIG. 7, the attitude indication icon is located in the lower part of the operation control page, and the attitude indication icon includes a slider bar 21, a slider 26 located on the slider bar 21, a first region 22, a second region 25, a first icon 23, and a second icon 24. As can be seen by the attitude indication icon in FIG. 7, since the slider 26 on the slider bar 21 is located on the right side of the slider bar 21, it can be determined that the user manipulated the motion sensing remote controller to rotate to the right, i.e., the motion sensing remote controller is deflected to the right; since the first icon is located in the upper left area of the first region 22, it can be determined that the user manipulates the motion sensing remote controller to roll to the left and lift its head upward. As shown in FIG. 7, the first icon 23 is located in the second region 25, which means that the horizontal roll angle and the pitch angle of the motion sensing remote controller are both zero and the motion sensing remote controller is in a horizontal state.

In response to the attitude adjustment operation of the motion sensing remote controller by the user, the attitude indication icon may be changed, and the movable platform may be controlled according to the current attitude information of the motion sensing remote controller.

Among them, the yaw angle of the motion sensing remote controller may control the yaw angle of the movable platform, the roll angle of the motion sensing remote controller may control the lateral translation movement of the movable platform left and right, and the pitch angle of the motion sensing remote controller may control the forward and backward translation movement of the movable platform.

For example, if the movable platform is a drone, the Yaw of the motion sensing remote controller can control the yaw rotation of the drone, the Roll of the motion sensing remote controller can control the Roll axis of the drone and the lateral translational flight of the drone, and the Pitch of the motion sensing remote controller controls the Pitch axis of the drone and the forward and backward translational flight of the drone.

Figure 8A:
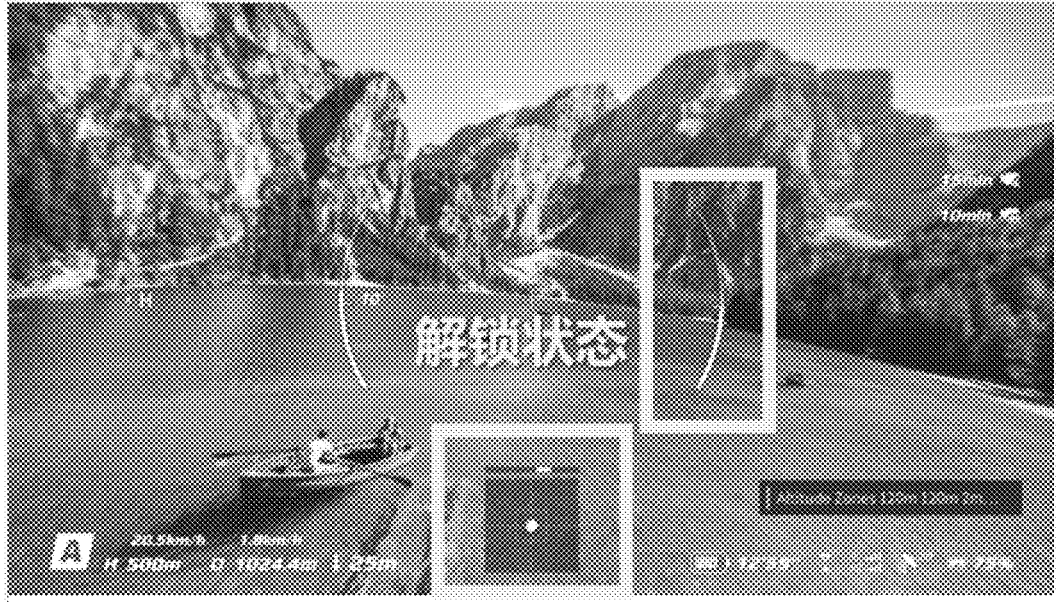
FIG. 8a and FIG. 8b are schematic diagrams of an operation control page of a movable platform in an embodiment of the present application.
Figure 8B:
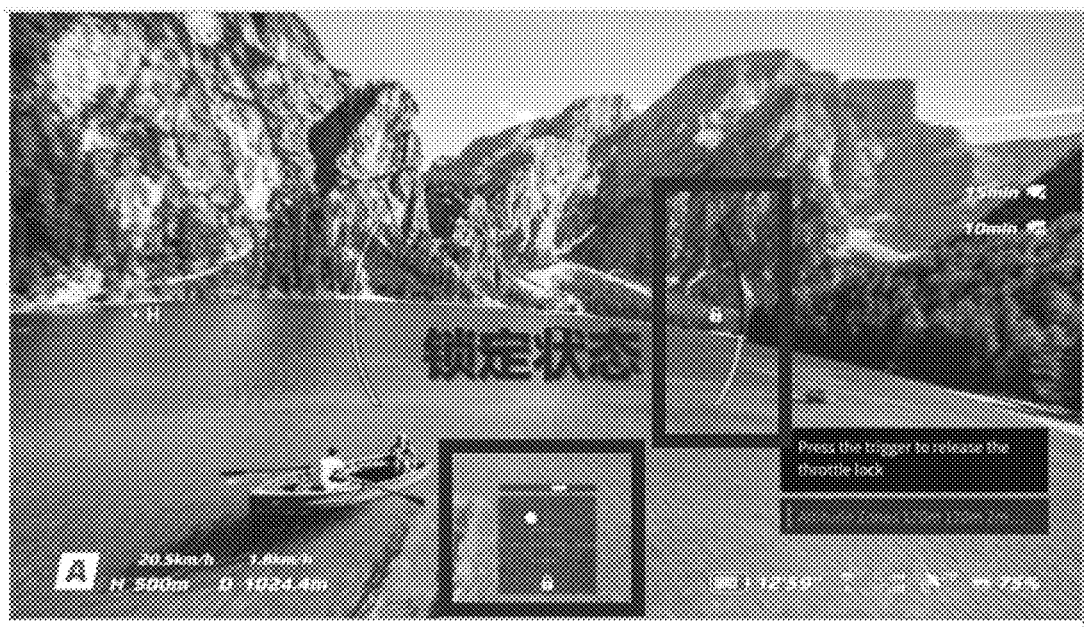

For example, the attitude indication icon in the unlocked state is shown in FIG. 8a, and the attitude indication icon in the locked state after unlocking is shown in FIG. 8b. FIG. 8a illustrates the horizontal stick amount and throttle stick amount in the unlocked state, indicating the relative attitude and throttle position, respectively. FIG. 8b illustrates the horizontal stick amount and the throttle stick amount in the locked state, indicating the absolute attitude and the throttle position, respectively. Where, relative attitude is the attitude relative to the initialized position, and absolute attitude is the absolute attitude relative to the ground coordinate system.

Figure 9:
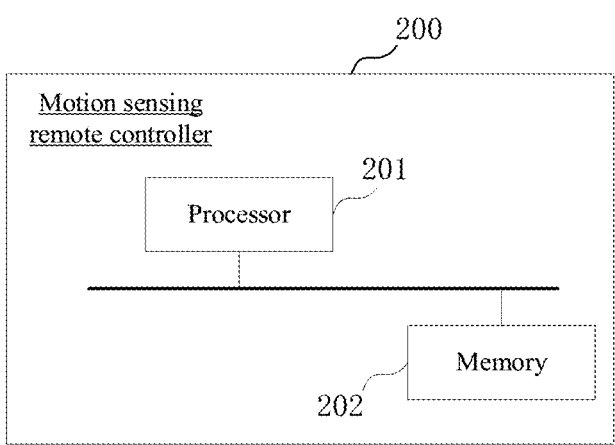
FIG. 9 is a schematic block diagram of a motion sensing remote controller provided by an embodiment of the present application.

Referring to FIG. 9, FIG. 9 is a schematic block diagram of a motion sensing device provided in an embodiment of the present application. The motion sensing device is used to control the operation of a movable platform, and the movable platform is equipped with a radar for scanning crops in a target operation area.

As shown in FIG. 9, the motion sensing remote controller 200 may also include at least one or more processors 201 and memory 202.

Wherein, the processor 201 may be, for example, a Micro-controller Unit (MCU), a Central Processing Unit (CPU), or a Digital Signal Processor (DSP), etc.

The memory 202 can be a Flash chip, a Read-Only Memory (ROM) disk, an optical disk, a USB flash drive, or a removable hard drive, etc.

wherein the memory 202 is used to store a computer program; and the processor 201 is used to execute the computer program and, in executing the computer program, to execute the control method of the movable platform as described in any of the embodiments provided in this application to improve the operational safety of the movable platform and the user experience.

Exemplarily, the processor for executing the computer program and, while executing the computer program, implementing the operation of:

acquiring a movement scenario and/or an operating mode of a movable platform;

determining control strategy of a motion sensing remote controller according to the motion scenario and/or the operating mode; and control the movable platform based on the control strategy.

In some embodiments, different locking states corresponding to different control strategies, the different locking states including at least one of a fully locked state, a semi-locked state, and an unlocked state.

In some embodiments, the fully locked state is used to shield the motion sensing remote controller from sending the current real stick amount to the moveable platform; the semi-locked state is used to shield the motion sensing remote controller from sending the current horizontal stick amount to the moveable platform; and the unlocked state is used to send the current horizontal stick amount as well as the current throttle stick amount to the moveable platform.

In some embodiments, the control strategy comprises a first control strategy, a second control strategy, and a third control strategy, the first control strategy corresponding to a fully locked state, the second control strategy corresponding to a semi-locked state, and the third control strategy corresponding to an unlocked state.

In some embodiments, the motion scenarios include at least one of auto-return, auto-landing, active braking, and dangerous scenarios.

In some embodiments, the dangerous scenarios include loss-of-control scenarios, low battery forced landing scenarios, and passively triggered braking scenarios.

In some embodiments, the operating mode comprises a switching mode, wherein the switching mode comprises at least one of: a flight mode switching of the movable platform and a mode switching operation of the motion sensing remote controller.

In some embodiments, the movable platform comprises at least one of a UAV, a manned vehicle, a robot, and a remote-controlled toy.

In some embodiments, the determining control strategy for the motion sensing remote controller based on the motion scenario and/or the operating mode, comprising.

determining that the UAV is in auto-return or auto-landing, controlling the motion sensing remote controller to execute a first control strategy to control the motion sensing remote controller in a fully locked state.

In some embodiments, when in the fully locked state, the motion sensing remote controller is controlled not to automatically return to middle positions of the horizontal stick amount and the throttle stick amount; or, when in the fully locked state, the motion sensing remote controller is controlled not to perform stick amount superimposition for user's stick amount operations; or, when in the fully locked state, the motion sensing remote controller is controlled to perform stick amount superimposition for user's stick amount operations on a specific flight trajectory of the UAV.

In some embodiments, the particular flight trajectory includes a return trajectory.

In some embodiments, the determining a control strategy for the motion sensing remote controller based on the motion scenario and/or the operating mode comprising.

when a mode switching operation of the motion sensing remote controller is detected, controlling the motion sensing remote controller to execute a first control strategy to control the motion sensing remote controller in a fully locked state.

In some embodiments, the determining a control strategy for the motion sensing remote controller based on the motion scenario and/or the operating mode, comprising.

when the motion sensing remote controller is detected to be in a brake operation, the motion sensing remote controller is controlled to execute a first control strategy to control the motion sensing remote controller to be in a fully locked state.

In some embodiments, the determining a control strategy for the motion sensing remote controller based on the motion scenario and/or the operating mode, comprising.

when detecting that the movable platform is in a dangerous scenario, controlling the motion sensing remote controller to execute a first control strategy to control the motion sensing remote controller in a fully locked state.

In some embodiments, if the dangerous scenario is a loss of control scenario, upon recovery from the loss of control, controlling the motion sensing remote controller in a fully locked state and controlling the movable platform in a hover, and outputting an alert message to prompt the user to control the movable platform by unlocking the fully locked state.

In some embodiments, if the dangerous scenario is a forced landing, the motion sensing remote controller is unlocked according to the unlocking operation of the user in the automatic landing of the drone.

In some embodiments, if the dangerous scenario is a passively triggered brake, after the brake is applied, the motion sensing remote controller is unlocked according to the unlocking operation of the user.

In some embodiments, the unlocking comprises going from a fully locked state to an unlocked state, or from a semi-locked state to an unlocked state.

Locking includes going from an unlocked state to a fully locked state, or from an unlocked state to a semi-locked state.

In some embodiments, the unlocking operation corresponds to a different operation in different gears and in different operating modes; the locking operation corresponds to a different operation in different gears and in different operating modes.

In some embodiments, the processor implements the following operations:

If the motion scenario of the UAV is determined to be any of auto-return, auto-landing, hovering, forced landing and two-stage landing, the motion sensing remote controller is controlled to execute a first control strategy to control the motion sensing remote controller in a fully locked state; wherein the two-stage landing is a second landing triggered by the user again in the auto-landing.

In some embodiments, the control of the movable platform based on the control strategy, comprising.

adopting full shielding or partial shielding of the stick amount of the motion sensing remote controller controlling the moveable platform; wherein the full shielding corresponds to a fully locked state and the partial shielding corresponds to a semi-locked state or an unlocked state.

In some embodiments, the control of the movable platform based on the control strategy, comprising.

for the stick amount of the motion sensing remote controller controlling the movable platform, adopting any one of the methods of weakening the effect of the stick amount, optimizing the stick amount manipulation and manipulating the stick amount in a specific scenario.

In some embodiments, the weakening the effect of the stick amount includes partial shielding, full shielding, and reducing the sensitivity and response range of the stick amount by adjusting parameters; wherein the partial shielding includes shielding the horizontal stick amount or shielding the vertical stick amount.

In some embodiments, the manipulating the stick amount in a specific scenario includes any of: shielding vertical stick amount in a fixed-height motion scenario, shielding all stick amount when the flight is aborted in a dangerous scenario, and shielding all stick amount in a user-defined scenario.

In some embodiments, the optimizing stick amount manipulation includes: allowing the user to control a single direction, allowing the user to control the amount of manipulation, and guiding the user through the UI interface for manipulation; wherein the single direction includes roll direction, pitch direction, and yaw direction.

In some embodiments, the motion sensing remote controller comprises different buttons, the different buttons corresponding to different functions when the motion sensing remote controller is in different operating modes.

In some embodiments, the control strategy of the motion sensing remote controller is different in different operating modes; the control strategy of the motion sensing remote controller is different in different gears in the same operating mode; wherein the different gears include at least a first gear, a second gear and a third gear.

In some embodiments, the motion sensing remote controller uses the attitude information of the motion sensing remote controller as the control command, and/or, the motion sensing remote controller uses the relative attitude of the motion sensing remote controller as the control command.

In some embodiments, the processor implements the following operations.

displaying an operation control page of the movable platform, the operation control page comprising an attitude indication icon of the motion sensing remote controller, the attitude indication icon being used to indicate attitude information of the motion sensing remote controller.

In some embodiments, the attitude indication icon comprises a slider bar, a slider located on the slider bar, a first region, a second region, and a first icon.

wherein the first icon is located in the first area and the second area is located in the center of the first area, the slider bar and the slider are used to indicate the horizontal rotation direction of the motion sensing remote controller, and the position of the first icon in the first area is used to indicate the tilting direction of the motion sensing remote controller in the pitch direction and the roll direction.

In some embodiments, a second icon is displayed on the attitude indication icon when the movable platform stops moving, the second icon being used to indicate that the movable platform has stopped moving.

In some embodiments, when the first icon is located in the second area, it indicates that both the horizontal roll angle and the pitch angle of the motion sensing remote controller are zero.

In some embodiments, the processor implements the following operations.

changing the attitude indication icon in response to a user's attitude adjustment operation of the motion sensing remote controller, and controlling the movable platform based on the current attitude information of the motion sensing remote controller.

Some embodiments of the present application further provide a computer readable storage medium, the computer readable storage medium storing a computer program, the computer program comprising program instructions, the processor executing the program instructions to implement the control method of the movable platform described in any of the above embodiments provided.

The computer readable storage medium may be an internal storage unit of the removable platform or motion sensing device described in any of the preceding embodiments, such as the memory or RAM of the motion sensing remote controller. The computer readable storage medium may also be an external storage device of the motion sensing remote controller, such as a plug-in hard drive, Smart Media Card (SMC), Secure Digital (SD) card, Flash Card, etc. equipped on the motion sensing remote controller.

The above mentioned is only a specific implementation of the present application, but the scope of protection of the present application is not limited to this, and any person skilled in the art can easily think of various equivalent modifications or substitutions within the technical scope disclosed in the present application, which should be covered by the scope of protection of the present application. Therefore, the scope of protection of this application shall be subject to the scope of protection of the claims.

What is claimed is:

1. A method of controlling a movable platform, which applies to a motion sensing remote controller, the method comprising:

acquiring at least one of a motion scenario or a working mode of the movable platform;

determining a control strategy of the motion sensing remote controller based on the at least one of the motion scenario or the working mode;

detecting a transition into an unlocked state of the motion sensing remote controller;

in response to the transition into the unlocked state of the motion sensing remote controller, resetting a zero-point value of yaw according to an attitude of the motion sensing remote controller at a time of the transition into the unlocked state; and controlling the movable platform based on the control strategy, comprising controlling an attitude of the movable platform based on the attitude of the motion sensing remote controller, wherein the attitude of the movable platform and the attitude of the motion sensing remote controller each comprise at least one of a yaw angle, a roll angle, or a pitch angle.

2. The method according to claim 1, wherein the control strategy changes correspondingly according to a locking state of the motion sensing remote controller, and the locking state comprises at least one of a fully locked state, a semi-locked state or the unlocked state.

3. The method according to claim 2, wherein the fully locked state is configured to shield the motion sensing remote controller from sending current real stick amounts to the moveable platform; the semi-locked state is configured to shield the motion sensing remote controller from sending a current horizontal stick amount to the moveable platform; and the unlocked state is configured to send the current horizontal stick amount as well as a current throttle stick amount to the moveable platform.

4. The method according to claim 2, wherein the control strategy comprises a first control strategy, a second control strategy or a third control strategy, the first control strategy corresponding to the fully locked state, the second control strategy corresponding to the semi-locked state, and the third control strategy corresponding to the unlocked state.

5. The method according to claim 1 wherein the motion scenario comprises at least one of auto-return, auto-landing, active braking, hovering, forced landing, two-stage landing, or dangerous scenario.

6. The method according to claim 5, wherein the determining the control strategy of the motion sensing remote controller based on the at least one of the motion scenario or the working mode comprises:

determining that the movable platform is in the auto-return or the auto-landing, and controlling the motion sensing remote controller to execute the first control strategy to control the motion sensing remote controller to be in the fully locked state.

7. The method according to claim 6, wherein, in the fully locked state, the motion sensing remote controller is controlled not to automatically return to middle positions of a horizontal stick amount and a throttle stick amount; or in the fully locked state, the motion sensing remote controller does not superimpose stick amounts for a user's stick amount operation control; or in the fully locked state, the motion sensing remote controller is controlled by the user's stick operation control to perform stick superimposition on a specific flight trajectory of the movable platform.

8. The method according to claim 1 wherein the working mode comprises a switching mode, the switching mode comprises at least one of: a flight mode switching operation of the movable platform or a mode switching operation of the motion sensing remote controller.

9. The method according to claim 8, wherein the determining the control strategy of the motion sensing remote controller based on at least one of the motion scenario or the working mode comprises:

detecting that the working mode is the switching mode and controlling the motion sensing remote controller to execute the first control strategy so as to control the motion sensing remote controller to be in the fully locked state; or detecting that the movable platform is in the active braking and controlling the motion sensing remote controller to execute the first control strategy so as to control the motion sensing remote controller to be in the fully locked state; or detecting that the movable platform is in the dangerous scenario and controlling the motion sensing remote controller to execute the first control strategy so as to control the motion sensing remote controller to be in the fully locked state.

10. The method according to claim 9, wherein when the dangerous scenario is the forced landing, the motion sensing remote controller is unlocked according to the user's unlocking operation during landing process of the movable platform; or when the dangerous scenario is passively triggered braking, the motion sensing remote controller is unlocked according to the user's unlocking operation after the braking.

11. The method according to claim 10, wherein the unlocking operation comprises going from the fully locked state to the unlocked state, or from the semi-locked state to the unlocked state.

12. The method according to claim 11, wherein the unlocking operation corresponds to different modes of operation when the motion sensing remote controller is in different gears and/or different operating modes.

13. The method according to claim 1, wherein the method comprises:

determining that the motion scenario of the movable platform is one of auto-return, auto-landing, hovering, forced landing, or two-stage landing;

controlling the motion sensing remote controller to execute a first control strategy to control the motion sensing remote controller to be in a fully locked state; and wherein the two-stage landing is a second landing triggered by the user during the auto-landing.

14. The method according to claim 1, wherein the controlling the movable platform based on the control strategy comprises:

fully or partially shielding a stick amount of the motion sensing remote controller for controlling the movable platform, wherein the fully shielding corresponds to a fully locked state and the partially shielding corresponds to a semi-locked or unlocked state.

15. The method according to claim 1, wherein the controlling the movable platform based on the control strategy comprises:

controlling the stick amount of the motion sensing remote controller for controlling the movable platform according to one of weakening stick amount effect, optimizing stick amount manipulation, or manipulating the stick amount in a specific scenario.

16. The method according to claim 15, wherein the weakening the stick amount effect comprises partially shielding, fully shielding or reducing sensitivity and response range of the stick amount by adjusting parameters;
   wherein the partially shielding comprises shielding a horizontal stick amount or shielding a vertical stick amount.

17. The method according to claim 15, wherein the manipulating the stick amount in the specific scenario comprises one of: shielding a vertical stick amount in a fixed height motion scenario, shielding all stick amounts when a flight in a dangerous scenario aborts, or shielding all stick amounts in a user-defined scenario.

18. The method according to claim 15, wherein the optimizing stick amount manipulation comprises: allowing the user to control a single direction, allowing the user to control degree of manipulation and guiding the user through an UI interface for manipulation,
   wherein the single direction includes a roll direction, a pitch direction or a yaw direction.

19. The method of claim 1, wherein the movable platform rotates in yaw in response to a corresponding rotation of the motion sensing remote controller in roll.

20. The method of claim 1, wherein the movable platform rotates in pitch in response to a corresponding rotation of the motion sensing remote controller in pitch.

21. The method of claim 1, wherein the movable platform moves forward along a pitch angle direction in response to the motion sensing remote controller having a corresponding pitch angle and a throttle control at the motion sensing remote controller being activated.

22. A motion sensing remote controller, comprising:
   a processor and a memory;
   wherein the memory stores a computer program; the processor for executing the computer program and, in executing the computer program, implementing a method comprising:
   acquiring at least one of a motion scenario or a working mode of a movable platform;

determining control strategy of the motion sensing remote controller based on the at least one of the motion scenario or the working mode;
   detecting a transition into an unlocked state of the motion sensing remote controller;
   in response to the transition into the unlocked state of the motion sensing remote controller, resetting a zero-point value of yaw according to an attitude of the motion sensing remote controller at a time of the transition into the unlocked state; and
   controlling the movable platform based on the control strategy, comprising controlling an attitude of the movable platform based on the attitude of the motion sensing remote controller, wherein the attitude of the movable platform and the attitude of the motion sensing remote controller each comprise at least one of a yaw angle, a roll angle, or a pitch angle.

23. A method of controlling a movable platform, which applies to a motion sensing remote controller, the method comprising:
   acquiring at least one of a motion scenario or a working mode of the movable platform, the motion scenario comprising a forced landing scenario;
   determining a control strategy of the motion sensing remote controller based on the at least one of the motion scenario or the working mode; and
   controlling the movable platform based on the control strategy, comprising:
   controlling an attitude of the movable platform based on an attitude of the motion sensing remote controller, wherein the attitude of the movable platform and the attitude of the motion sensing remote controller each comprise at least one of a yaw angle, a roll angle, or a pitch angle; and
   partially shielding a stick amount of the motion sensing remote controller for controlling the movable platform based on the motion scenario of the movable platform, wherein a vertical stick amount but not a horizontal stick amount is shielded in response to the movable platform being in the forced landing scenario and a battery power level of the movable platform being less than a threshold.

\* \* \* \* \*